United States Patent
Karimli et al.

(10) Patent No.: US 11,140,258 B2
(45) Date of Patent: *Oct. 5, 2021

(54) CONTENT SHARING BETWEEN RELATED DEVICES

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/821,168

(22) Filed: Mar. 17, 2020

(65) Prior Publication Data

US 2020/0220972 A1 Jul. 9, 2020

Related U.S. Application Data

(63) Continuation of application No. 15/063,749, filed on Mar. 8, 2016, now Pat. No. 10,630,835.

(51) Int. Cl.
*H04M 3/42* (2006.01)
*H04L 29/06* (2006.01)
(Continued)

(52) U.S. Cl.
CPC .... *H04M 3/42059* (2013.01); *H04L 65/1016* (2013.01); *H04L 65/1073* (2013.01);
(Continued)

(58) Field of Classification Search
CPC ............ H04L 65/1016; H04L 65/1073; H04L 65/1093; H04M 1/72412; H04M 1/42469;
(Continued)

(56) References Cited

U.S. PATENT DOCUMENTS 7,711,002 B2  5/2010 Mukherjee et al.
8,520,072 B1  8/2013 Slavin et al.
(Continued)

FOREIGN PATENT DOCUMENTS

CN   101102248 A   1/2008
CN   101778244 A   7/2010
(Continued)

OTHER PUBLICATIONS

Chinese Office Action dated May 28, 2020 for Chinese Patent Application No. 201780044420.1, a aounterpart foreign application of the U.S. Appl. No. 15/212,760, 30 pages.
(Continued)

*Primary Examiner* — Wayne H Cai
(74) *Attorney, Agent, or Firm* — Lee & Hayes, P.C.

(57) ABSTRACT

Methods and computing systems for sharing content between related devices in a cellular network are described. A first device receives content from an external content source via a wireless connection, and causes presentation of the content on an output device of the first device. The first device retrieves information for one or more related devices that utilize the same telephone number the first device for sending and receiving at least cellular communications via the cellular network. The first device enables sharing of the content with at least one related device of the one or more related devices.

20 Claims, 5 Drawing Sheets

(51) Int. Cl.
*H04W 8/18* (2009.01)
*H04M 1/72412* (2021.01)
*H04M 1/72469* (2021.01)

(52) U.S. Cl.
CPC .... *H04L 65/1093* (2013.01); *H04M 3/42263* (2013.01); *H04M 1/72412* (2021.01); *H04M 1/72469* (2021.01); *H04M 3/42374* (2013.01); *H04W 8/183* (2013.01)

(58) Field of Classification Search
CPC ......... H04M 3/42263; H04M 3/42374; H04M 3/42059; H04W 8/183
See application file for complete search history.

(56) References Cited

U.S. PATENT DOCUMENTS

| | | | |
|---|---|---|---|
| 9,515,969 | B1 | 12/2016 | Eidelson et al. |
| 9,723,121 | B2 | 8/2017 | Lam et al. |
| 9,854,010 | B2 | 12/2017 | Raghavan et al. |
| 9,911,398 | B1 | 3/2018 | McQueen et al. |
| 2005/0038856 | A1 | 2/2005 | Krishnasamy et al. |
| 2005/0254481 | A1 | 11/2005 | Vishik et al. |
| 2007/0133455 | A1 | 6/2007 | Kuchibhotla et al. |
| 2008/0032703 | A1 | 2/2008 | Krumm et al. |
| 2008/0037752 | A1 | 2/2008 | Chatilov et al. |
| 2009/0119590 | A1 | 5/2009 | Kondziela et al. |
| 2009/0128335 | A1 | 5/2009 | Leung |
| 2009/0164645 | A1 | 6/2009 | Sylvain |
| 2009/0215477 | A1 | 8/2009 | Lee et al. |
| 2010/0159871 | A1 | 6/2010 | Tester |
| 2010/0304724 | A1 | 12/2010 | Lawler et al. |
| 2012/0157039 | A1 | 6/2012 | Lotter et al. |
| 2012/0317162 | A1 | 12/2012 | Endsley et al. |
| 2013/0013698 | A1 | 1/2013 | Relyea et al. |
| 2013/0023167 | A1 | 1/2013 | Ozawa |
| 2013/0024431 | A1 | 1/2013 | Parthasarathy et al. |
| 2013/0091298 | A1 | 4/2013 | Ozzie et al. |
| 2013/0184027 | A1 | 7/2013 | Becker et al. |
| 2013/0304694 | A1 | 11/2013 | Barreto et al. |
| 2014/0149512 | A1 | 5/2014 | Leitch |
| 2014/0280562 | A1 | 9/2014 | Shields |
| 2014/0282102 | A1 | 9/2014 | Avrahami |
| 2014/0310348 | A1 | 10/2014 | Keskitalo et al. |
| 2015/0009818 | A1 | 1/2015 | Xiao et al. |
| 2015/0095420 | A1 | 4/2015 | Haun et al. |
| 2015/0111553 | A1 | 4/2015 | Efrati et al. |
| 2015/0163295 | A1 | 6/2015 | Shmilov et al. |
| 2015/0208217 | A1 | 7/2015 | Hong et al. |
| 2015/0215233 | A1 | 7/2015 | Lee |
| 2015/0341288 | A1 | 11/2015 | Dandison et al. |
| 2015/0350124 | A1 | 12/2015 | Lee et al. |
| 2016/0036881 | A1 | 2/2016 | Tembey et al. |
| 2016/0044279 | A1 | 2/2016 | Block et al. |
| 2016/0050263 | A1 | 2/2016 | Hwang et al. |
| 2016/0149966 | A1 | 5/2016 | Remash et al. |
| 2016/0150063 | A1 | 5/2016 | Choi et al. |
| 2016/0150537 | A1 | 5/2016 | Jung et al. |
| 2016/0162252 | A1 | 6/2016 | Di Censo et al. |
| 2016/0164810 | A1 | 6/2016 | Wolz et al. |
| 2017/0264652 | A1 | 9/2017 | Karimli et al. |
| 2017/0264742 | A1 | 9/2017 | Karimli et al. |
| 2017/0359799 | A1 | 12/2017 | Karimli et al. |
| 2018/0060824 | A1 | 3/2018 | Shaaban et al. |
| 2019/0281579 | A1 | 9/2019 | Karimli et al. |

FOREIGN PATENT DOCUMENTS

| | | |
|---|---|---|
| CN | 102017650 A | 4/2011 |
| CN | 103442044 A | 12/2013 |
| CN | 103618779 A | 3/2014 |
| CN | 104012040 A | 8/2014 |
| CN | 104866264 A | 8/2015 |
| EP | 2590376 | 5/2013 |
| GB | 2426147 | 11/2006 |
| KR | 101475006 | 12/2014 |
| WO | WO2009108841 A3 | 9/2009 |
| WO | WO2013109034 | 7/2013 |

OTHER PUBLICATIONS

Office Action for U.S. Appl. No. 15/212,760, dated Jul. 8, 2020, Karimli, "Cross-Platform Video Conversation Between Related Devices", 12 pages.
Extended European Search Report dated Jan. 3, 2020 for European Patent Application No. 17831546.1, 8 pages.
Extended European Search Report dated Oct. 21, 2019 for European Patent Application No. 17763746.9, 8 pages.
Extended European Search Report dated Dec. 4, 2019 for European Patent Application No. 17810764.5, 8 pages.
Office Action for U.S. Appl. No. 15/212,760, dated Oct. 16, 2019, Karimli, "Cross-Platform Video Conversation Between Related Devices", 18 pages.
Office Action for U.S. Appl. No. 15/063,749, dated Oct. 2, 2019, Karimli, "Content Sharing Between Related Devices", 23 pages.
Office Action for U.S. Appl. No. 15/063,749, dated Dec. 11, 2017, Karimli, "Content Sharing Between Related Devices", 18 pages.
Office Action for U.S. Appl. No. 15/212,760, dated Dec. 15, 2017, Karimli, "Cross-Platform Video Conversation Between Related Devices", 22 pages.
Office action for U.S. Appl. No. 15/063,749, dated Feb. 8, 2017, Karimli et al., "Content Sharing Between Related Devices",16 pages.
Office Action for U.S. Appl. No. 15/247,470, dated Mar. 22, 2018, Karimli, "Device and/or Line Event Awareness and Smart Synchronization", 16 pages.
Office Action for U.S. Appl. No. 15/212,760, dated Apr. 12, 2019, Karimli et al, "Cross-Platform Video Conversion Between Related Devices", 15 pages.
Office Action for U.S. Appl. No. 15/063,749, dated Jun. 21, 2019, Karimli, "Content Sharing Between Related Devices", 23 pages.
Office action for U.S. Appl. No. 15/063,749, dated Jul. 11, 2017, Karimli et al., "Content Sharing Between Related Devices", 18 pages.
Office Action for U.S. Appl. No. 15/063,749, dated Jul. 11, 2018, Karimli, "Content Sharing Between Related Devices", 19 pages.
Office Action for U.S. Appl. No. 15/212,760, dated Jul. 31, 2018 Karimli, "Cross-Platform Video Conversation Between Related Devices", 19 pages.
Office Action for U.S. Appl. No. 16/422,757, dated Aug. 22, 2019, Karimli, "Device and/or Line Event Awareness and Smart Synchronization", 8 pages.
Office Action for U.S. Appl. No. 15/247,470, dated Aug. 25, 2017, Karimli, "Device and/or Line Event Awareness and Smart Synchronization", 12 pages.
Office action for U.S. Appl. No. 15/063,749, dated Aug. 24, 2016, Karimli et al., "Content Sharing Between Related Devices", 17 pages.
Office Action for U.S. Appl. No. 15/247,470, dated Sep. 27, 2018, Karimli et al, "Device and/or Line Event Awareness and Smart Synchronization", 15 pages.
PCT Search Report and Written Opinion dated Oct. 24, 2017 for PCT application No. PCT/US2017/040464, 14 pages.
PCT Search Report and Written Opinion dated Jun. 9, 2017 for PCT Application No. PCT/US17/19714, 12 pages.
PCT Search Report and Written Opinion dated Sep. 12, 2017 for PCT Application No. PCT/US17/35768, 9 pages.
Office Action for U.S. Appl. No. 15/212,760, dated Nov. 12, 2020, Karimli,"Cross-Platform Video Conversation Between Related Devices", 15 PAges.
Office Action for U.S. Appl. No. 16/422,757, dated Dec. 4, 2020, Karimli, "Device and/or Line Event Awareness and Smart Synchronization", 13 Pages.
Chinese Office Action dated Sep. 23, 2020 for Chinese Patent Application No. 201780015721.1, a counterpart of U.S. Pat. No. 10,630,835, 24 pages.

(56) References Cited

OTHER PUBLICATIONS

Chinese Office Action dated Apr. 7, 2021 for Chinese Patent Application No. 201780035674.7, a counterpart foreign application of U.S. Pat. No. 10,356,745, 15 pages.
Office Action for U.S. Appl. No. 15/212,760, dated May 5, 2021, Karimli, "Cross-Platform Video Conversation Between Related Devices", 20 pages.

CONTENT SHARING BETWEEN RELATED DEVICES

CROSS REFERENCE TO RELATED APPLICATIONS

This is a continuation application which claims priority to commonly assigned, co-pending U.S. patent application Ser. No. 15/063,749, filed Mar. 8, 2016. Application Ser. No. 15/063,749 is fully incorporated herein by reference.

BACKGROUND

Users have multiple telecommunication devices such as cellular phones, tablet computers, laptops, and other devices. Each device may have its own communication address, such as a telephone number, and may receive communications directed to any communication address associated with a service account.

In (IP) Multimedia Subsystem (IMS), call forking may be achieved through implicit registration sets (IRS). With IRS, when any one network identity (e.g., IP Multimedia Public Identifier (IMPU)) associated with a communication address is registered, other network identities associated with a same service account as that network identity are also registered. When a communication is received and directed to any one network identity of the registration set, it may be sent to all network identities of that registration set.

Session Initiation Protocol (SIP), as extended by RFC 3265 ("Session Initiation Protocol (SIP)-Specific Event Notification", June 2002), utilizes a subscribe method to request a current state as well as state updates from a remote node. The specification for Open Mobile Alliance (OMA) Presence SIMPLE (SIP for Instant Messaging and Presence Leveraging Extensions) defines mechanisms for utilizing SIP to perform instant messaging and other functions. Rich Communication Services (RCS) is a GSM Association (GSMA) program that provides for inter-operability within an IP Multimedia Subsystem (IMS). One feature of RCS is the ability to discover capabilities of contacts. RCS utilizes OMA SIMPLE for various features, including subscription to a presence server to obtain capability information for a list of contacts.

Multimedia Broadcast Multicast Service (MBMS) is a Third Generation Partnership project (3GPP) interface specification for multicast and broadcast transmissions within cell sites as well as within a core network. Operators are expected to dedicate portions of spectrum for broadcast or multicast. eMBMS is an enhanced version of MBMS for Long-Term Evolution (LTE) cellular networks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
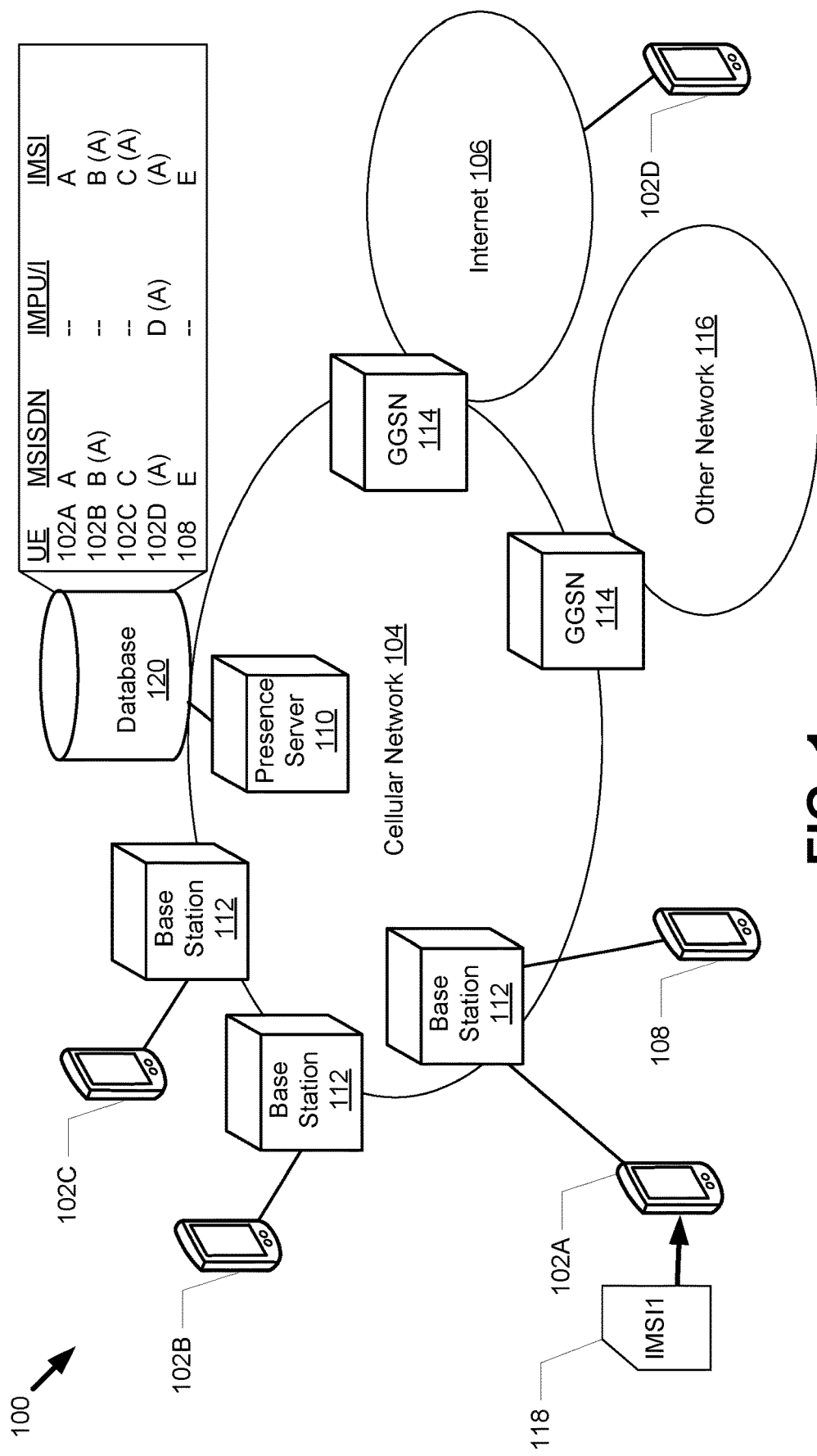
FIG. 1 illustrates an environment for sharing content amongst a plurality of related devices.

In embodiments of the present disclosure, related devices are enabled to share content with one another. A group of related devices includes devices that are associated with the same subscriber account, sharing the same cellular telephone line, and so forth. Devices sharing the same account are often associated with an international mobile subscriber identity (IMSI). Devices sharing the same telephone line are configured to send, receive, and initiate, cellular communications using a shared identifier, communications address, and so forth, such as a telephone number, MSISDN (sometimes referred to as the "Mobile Station International Subscriber Directory Number"), IP Multimedia Public Identifiers (IMPU), and so forth. Thus, devices are related in some embodiments based on their being associated with the same "account" (e.g., associated with an IMSI), associated with the same "line" (e.g., associated with the same telephone number), and so forth. Related devices include devices for which incoming calls and messages (such as Short message Service (SMS) messages) sent to the common communication address may be sent to all of the related devices. Related devices include devices that are In embodiments of the present disclosure, other content received by one of the related devices may be shared with the one or more of the related devices.

In some embodiments, the content may include content received via the cellular network. The content may be received via broadcast or multicast communications, which may be received via the cellular network. The broadcast or multicast communications may be localized, such as within a cell site (e.g., devices connected to one or more base stations associated with a cell site), or within a larger network such as within a provider's core network or other. In some embodiments, the broadcast or multicast content may be received via an eMBMS interface. Such broadcast or multicast content received by one related device may be shared with one or more other related devices. In some embodiments, the content received by the related device and shared with the other related devices may be received in a non-broadcast or multi-cast manner, such as via a unicast connection, including a multimedia stream or other. The content may be shared using the cellular network, or using other access network such as via a Wi-Fi network that provides access to the Internet or other network.

The sharing of the content may be within a contained grouping of related devices, such that other devices that do not share an account, telephone number, line, etc. are not permitted to receive the content. Presence information for the related devices may be obtained from a presence server, such as a SIP server or other. Information obtained from the presence server—such as Internet Protocol (IP) addresses or other network address information—may be utilized to establish a connection amongst related devices to share the content. Information obtained from the presence server may be utilized to identify the related devices. Information obtained from the presence server may be utilized to identify those related devices that are currently online. The presence server may also be utilized to establish the communications sessions, and may enforce a sharing policy for certain types of content, such as a sharing policy that allows content—such as broadcast or multicast content—to be shared amongst related devices, and prevents the content from being shared with devices that do not share a line and/or an account with the device receiving the content in the first place.

Various examples of the present disclosure are described below in reference to the figures.

FIG. 1 illustrates an environment 100 for sharing content amongst a plurality of related devices 102. Related device 102A receives content from an external source, such as via a unicast, broadcast, or multicast source on the cellular network 104, the Internet 106, from another mobile device 108 (e.g., a mobile device that does not share a line and/or subscriber account with the mobile device 102A), or from some other external source. As used herein, the "external source" is any device other than the related devices 102A-C. The related device 102A is enabled to share the received content with other related devices 102, such as from the related device 102B and the related device 102C.

The related device 102A is configured to obtain presence information for one or more contacts, including the related devices 102B and 102C, from a presence server 110. The presence server may be a SIP server, and the related device 102A may be configured to utilize OMA Presence SIMPLE to obtain presence information regarding one or more contacts, including the related devices 102B and 102C. The related devices 102A-C are configured in some embodiments to provide their presence information to the presence server 110. The related devices 102A-C may be configured in some embodiments to provide capabilities information. The capabilities information may indicate an ability to receive instant messages, receive shared content, and so forth. In other embodiments, the related devices 102A-C may obtain each other's presence information in other ways, such as through static configuration, peer-to-peer connections, and so forth.

The related device 102A may utilize the presence information to determine those contacts that are related devices. For example, the presence information may include information about telephone numbers with which the mobile devices are registered. The related device 102A may utilize the presence information—including for example an IP address or other information—to establish a connection with the related devices 102B and 102C. The related device 102A may utilize the connection to share the content obtained from the external source to one or more of the other related devices 102B and 102C via the connection. The other related devices 102B and 102C may be configured to prompt a user of those devices to accept establishment of the connection and/or to receive the shared content.

In one example, the related device 102A receives a localized broadcast, such as via eMBMS via a base station 112. Because the related devices 102B and 102C are not connected to the same base station 112 as the related device 102A, they do not received the localized broadcast. Users of those devices, however, may desire or expect to receive the same content as the related device 102A by virtue of sharing the same line. A user of the related device may enable via a user interface element the content to be shared with the related devices 102B and 102C. Alternatively, the related device 102A may be configured to automatically transmit (e.g., without user intervention) to the related devices 102B and 102C an indication that shared content is available.

The related device 102A may establish a connection with the related devices 102B and 102C to share a connection. The connection may be established as a peer-to-peer connection directly between the related devices. In some embodiments, the connection may be established via the presence server 110, such as using the SIP protocol, which enables the establishment of content delivery between devices.

The cellular network 104 may be responsible for routing voice communication to other networks 116, as well as routing data communication to external packet switched networks, such as the Internet 106. For example, the network may include a Gateway GPRS Support Node (GGSN) 114 or another equivalent node. The user equipment (UE), e.g., the related devices 102A-D and the other device 108, may include one or more of a smart phone, a personal digital assistant, a netbook, a laptop computer, a smart appliance, and/or another electronic device that is capable of sending or receiving voice or data via the cellular network 104, a Wi-Fi network, or other access network.

A mobile device, such as the related devices 102A-C, and the mobile device 108, may include a subscriber identity module (SIM) card 118, which has an international mobile subscriber identity (IMSI) stored thereon. An IMSI is a unique 64-bit number. Within a GSM network, the IMSI is associated with the MSISDN, sometimes referred to as the "Mobile Station International Subscriber Directory Number," or more commonly as the telephone number. The MSISDN is a unique number that identifies a subscription on a GSM network and is also the number that can be used to place a call to the GSM phone. The MSISDN is not necessarily stored on the SIM card 118 or the phone, and the MSISDN is not permanently associated with the IMSI. The MSISDN may change if the subscription changes, for example.

In some examples, multiple UEs are registered with a common number (e.g., MSISDN, IMPU, IMPI, etc.), are associated with a common subscriber account (e.g., IMSI), and thus are "related devices" as used herein. For example, all related devices 102A-D may have their own unique IMSI programmed into their respective SIM cards, and which are associated with a specific telephone number (MSISDN), which may also be unique to each related device 102A-D. But the IMSI and MSISDN pair may associated in the network with "alias numbers" to allow for shared lines and/or shared accounts, thereby making them related devices. For example, the IMSI and MSISDN associations for related devices 102A-D are stored in a database 120. Related device 102A is associated with IMSI A and MSISDN A. Related device 102B is associated with IMSI B and MSISDN B, but also with alias MSISDN A and alias IMSI A. Thus, related device 102B is associated both with the same account and with the same line as related device 102A. Related device 102C is associated with IMSI C and MSISDN C, but also with alias IMSI A. Thus, related device 102C shares an account (IMSI A) but not a telephone line with related device 102A. Some related devices (e.g., related device 102D), which may not capable of connecting through a base station of the cellular network 104, may also register with the cellular network 104 through the Internet using a unique identifier, such as an IMPI or IMPU, a globally routable user agent URI (GRUU), or other. These identifiers may take the form of a telephone number (e.g., they may resemble an MSISDN). The cellular network 104 forwards calls and messages to the related device 102D, and the related device 102D may be enabled to send or receive shared content in a same or similar way as with related devices 102A-C. As illustrated in database 120 in FIG. 1, related device 102D is associated with IMPU D, and also with alias IMPU A. Related device 102D therefore shares a telephone line with related devices A and B and an account with related devices A, B, and C.

The presence server 110 may retrieve the association data that corresponds to the IMSI, IMPU/IMPI of the related devices 102A-D from the database 120. The data may include information specifying the associated device number (e.g., a MSISDN, IMPI, IMPU, or the like) for which the related devices 102A-D are able to utilize for initiating, sending and receiving communications. Thus the presence information provided to the related device 102A regarding related devices 102B-D may indicate the shared line or account (e.g., may indicate whether and how the devices are related devices), thereby enabling the shared device 102A to recognize that the related devices 102B-D are related devices that share the same account and/or line as the related device 102A, as well as to distinguish those that are not related devices (such as other mobile device 108). In some embodiments, the related device 102A may request from the presence server 110 a list of related devices 102A-D.

In some examples, the logic to enable content sharing amongst related devices 102A-D may be on the related devices 102A-D. In those embodiments, the related devices 102A-D enforce a share policy to enable certain content to be shared amongst the related devices 102A-C, while preventing access to or sharing of the content with other devices. In some examples, the content sharing is established via the presence server 110. In these examples, the presence server 110 may enforce the shared content policy. In some examples, the share policy may limit content sharing to related devices that share the same account, to related devices that share the same line, and so forth. Embodiments are not limited to these examples, and the shared content policy may be enforced by other network elements, such as by a separate SIP server, by the recipient related device that receives the content, by the base stations 112, and so forth.

Figure 2B:
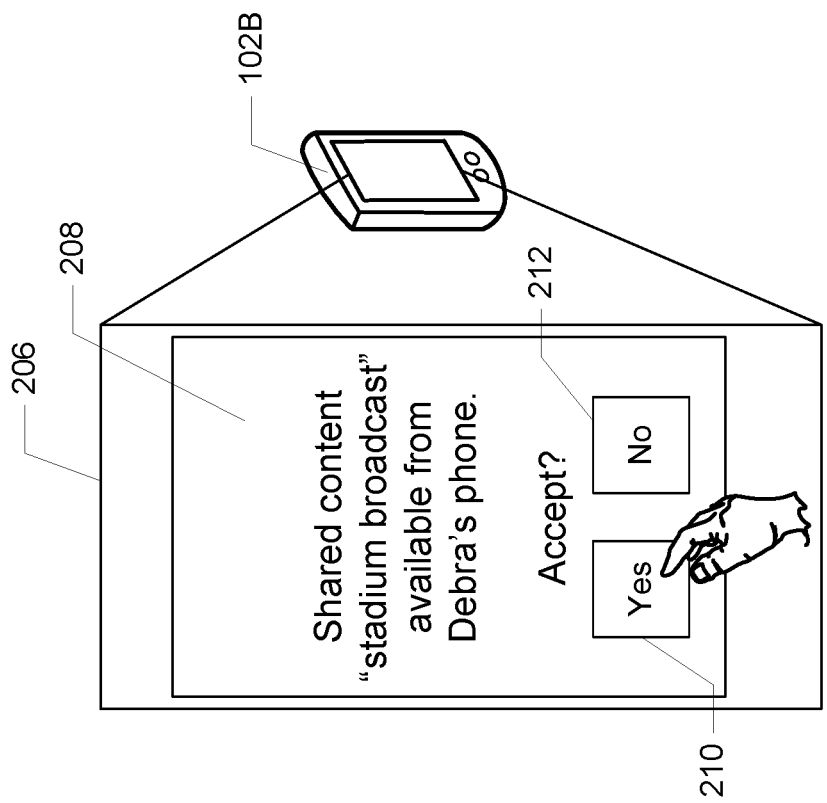
FIG. 2B illustrates a user interface for a related device that enables a user to select to receive and/or view shared content.
Figure 2A:
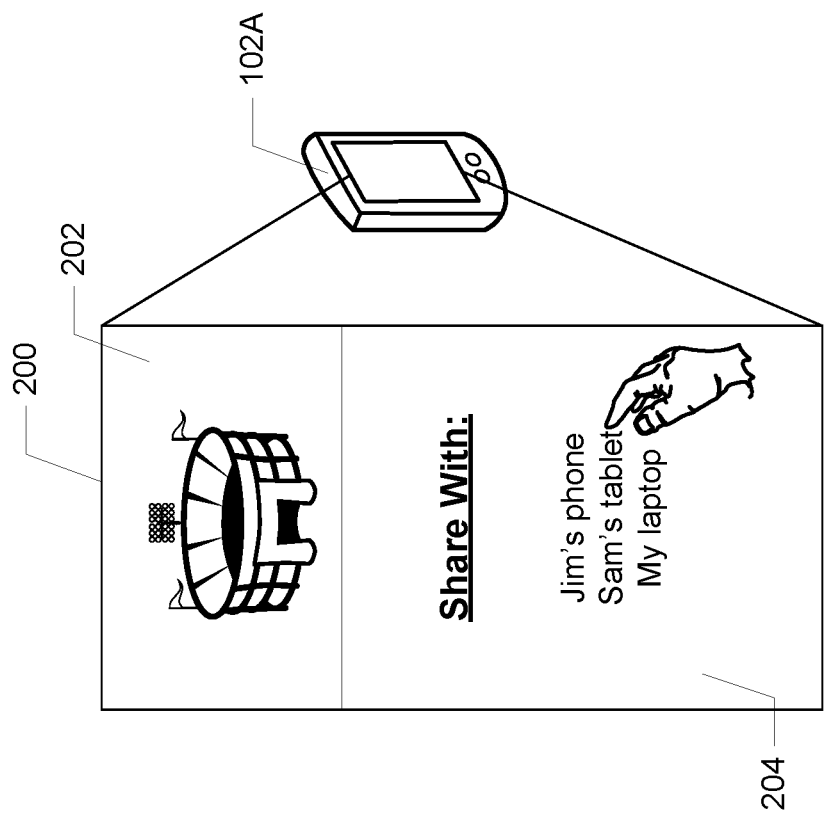
FIG. 2A illustrates a user interface that enables a user to select related devices to share content received from an external source.

FIG. 2A illustrates a user interface 200 that enables a user to select related devices to share content received from an external source. The user interface 200 includes a display portion 202 in which the content received from the external source is displayed. In the example illustrated in FIG. 2A the content is graphical in nature, such as an image or a video content. Other types of content are also possible without departing from the scope of embodiments. The content may include multimedia content, audio content, video content, text-based content, game content, document viewing or collaboration content, and so forth.

The user interface 200 also includes a user interface portion 204 that lists the one or more related devices with which the content received from the external source may be selected for sharing. As described elsewhere within this detailed description, the list of related devices may include those related devices that are currently online (e.g., have registered their online presence with the presence server 110). Offline related devices may be omitted from the user interface portion 204. Offline related devices may be shown but indicated as offline, such as grayed-out, with an "offline" indicator, or in some other way. Selection to share with an offline device may result in those devices being provided with a notification of the availability of shared content when they register their online presence. The related devices may indicate which devices share the same account and/or which share the same line. As noted elsewhere in this detailed description, a share policy may permit sharing of the content with related devices that share an account. In some examples, a share policy may enable or permit sharing of content with related devices that share a same line, while preventing related devices that do not share a same line (e.g., those that share a subscriber account, but not the same line). Thus, the list may include the related devices for which sharing is permitted, and omit those devices for which sharing is not permitted, such as based on those devices not sharing the same account, not sharing the same line, etc. In some examples, those related devices for which content sharing is not permitted may be listed but indicated as not allowed to share content, such as by graying them out, or by some other visual indicator.

Although the example illustrated in FIG. 2 shows the content received from the external source as being displayed simultaneously with the display of the user interface portion 204, embodiments of the present disclosure are not limited to simultaneous display. In some embodiments, the content can be viewed before or after sharing. In some embodiments, the content may not be displayed on the device that shares it at all. Other examples are possible without departing from the scope of embodiments.

FIG. 2B illustrates a user interface 206 for a related device that enables a user to select to receive and/or view shared content. The user interface may include a portion 208, which may include a pop-up or other notification that indicates that content received by a related device from an external source is available for retrieval and/or viewing or other rendering from the related device. The user interface 206 may include user selectable elements 210 and 212 that enable the user to accept or decline the content.

The user interfaces 200 and 206 illustrated in FIGS. 2A and 2B are examples only. Other examples are possible without departing from the scope of embodiments.

Figure 3:
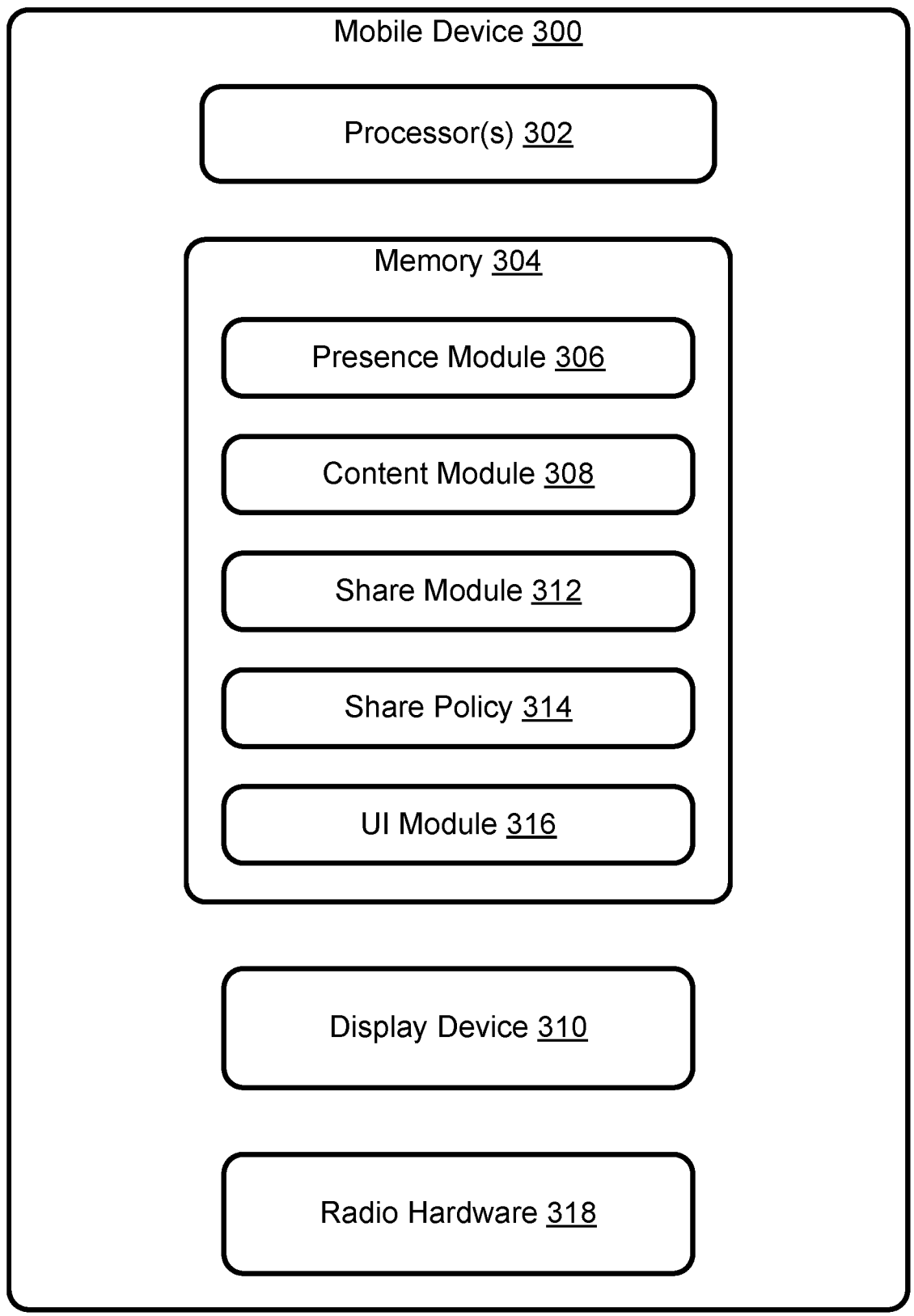
FIG. 3 illustrates an example mobile device configured to share content received from an external source with related devices.

FIG. 3 illustrates an example mobile device 300 configured to share content received from an external source with related devices. As illustrated in FIG. 3, the mobile device 300 includes processor(s) 302 and memory 304. The memory 304 includes a presence module 306 configured to retrieve presence information for one or more related devices. The related devices share a same subscriber account and/or a same telephone number for sending and receiving at least cellular communications as described elsewhere within this detailed description. The related devices may include cellular telephone devices that are configured to utilize a shared telephone number to send and receive cellular communications via the cellular network. The related devices may include related devices that connect via a Wi-Fi or other access network to the Internet or other packet-based network. The presence module 306 may be configured to retrieve the presence information from a presence server, such as via OMA Presence SIMPLE protocol, or in some other fashion.

The memory 304 includes a content module 308 configured to retrieve content from an external source, such as via the cellular network, the internet or other source. The content module 308 is configured in some embodiments to receive the content via a multicast or broadcast source, such as via an enhanced Multimedia Broadcast Multicast Services (eMBMS) interface. In some embodiments, the content module 308 is configured to receive the content from some other source, such as an internet streaming site, another mobile device, and so forth. The content module 308 is configured to cause the content to be displayed on a display device 310. The content module 308 may save the content received from the external source to the memory 304 for later access. The content module 308 may also be configured to retrieve content from another related device that the other related device received from an external source, and cause it to be rendered on the display device 310.

A share module 312 is configured to enable a user of the device to share the content with at least one related device, such as the related devices 102A-D. The share module 312 may be configured to enable a user of the mobile device 300 to select content that is received by another related device from an external source, and is being shared with the mobile device 300 by the other related device. The share module 312 may be configured to establish a connection, such as via a presence server or via a peer-to-peer connection, with a share module of another related device. In some embodiments, the presence information is utilized by the share module 312 to establish a connection between the mobile device and the related device(s), in order to share the content. The share module 312 may be configured to enforce a share policy 314. The share policy 314 may indicate that certain content, such as broadcast content, multicast content, certain streamed content from a content provider (e.g., copyrighted content), content subject to digital rights management (DRM) protections, and so forth may be shared with related devices, and that such content is not to be shared with other devices that do not share a line or account with the device that received the content from the external source.

In some embodiments, the presence information includes information regarding telephone numbers that are associated with the related devices, and the share module 312 is configured to restrict sharing of the content to the one more related devices based at least on the information regarding telephone numbers indicating that the one or more related devices share the telephone number with the mobile device 300.

A user interface module 316 is configured to cause display via a user interface of a list of one or more related devices. The user interface is interactive to receive user selection of the at least one device for sharing of the content. The user interface module 316 may interact with the share module 312, such as by calling an Application Programming Interface (API) or other, to initiate the sharing of the content. The user interface module 316 may interact with the presence module 306, such as by calling another API or other, to retrieve the list of related devices, including their current online presence status (e.g., online or offline, busy, accepting shared content, etc.).

Radio hardware 318 provides wireless UE capabilities, such as connecting to a cellular network base station, a Wi-Fi network, or other wireless network. The radio hardware 318 may include or be incorporated into processors, application-specific integrated circuits (ASICs), programmable circuits such as field programmable gate arrays (FPGAs), or in other ways. The software modules stored on the memory 304 are configured to access hardware via interrupts, calling APIs, and the like. The software modules may also be configured to pass information to one another, such as through APIs, by storing commands, parameters, etc. in a predetermined memory location, etc. Other examples are possible without departing from the scope of embodiments.

Figure 4:
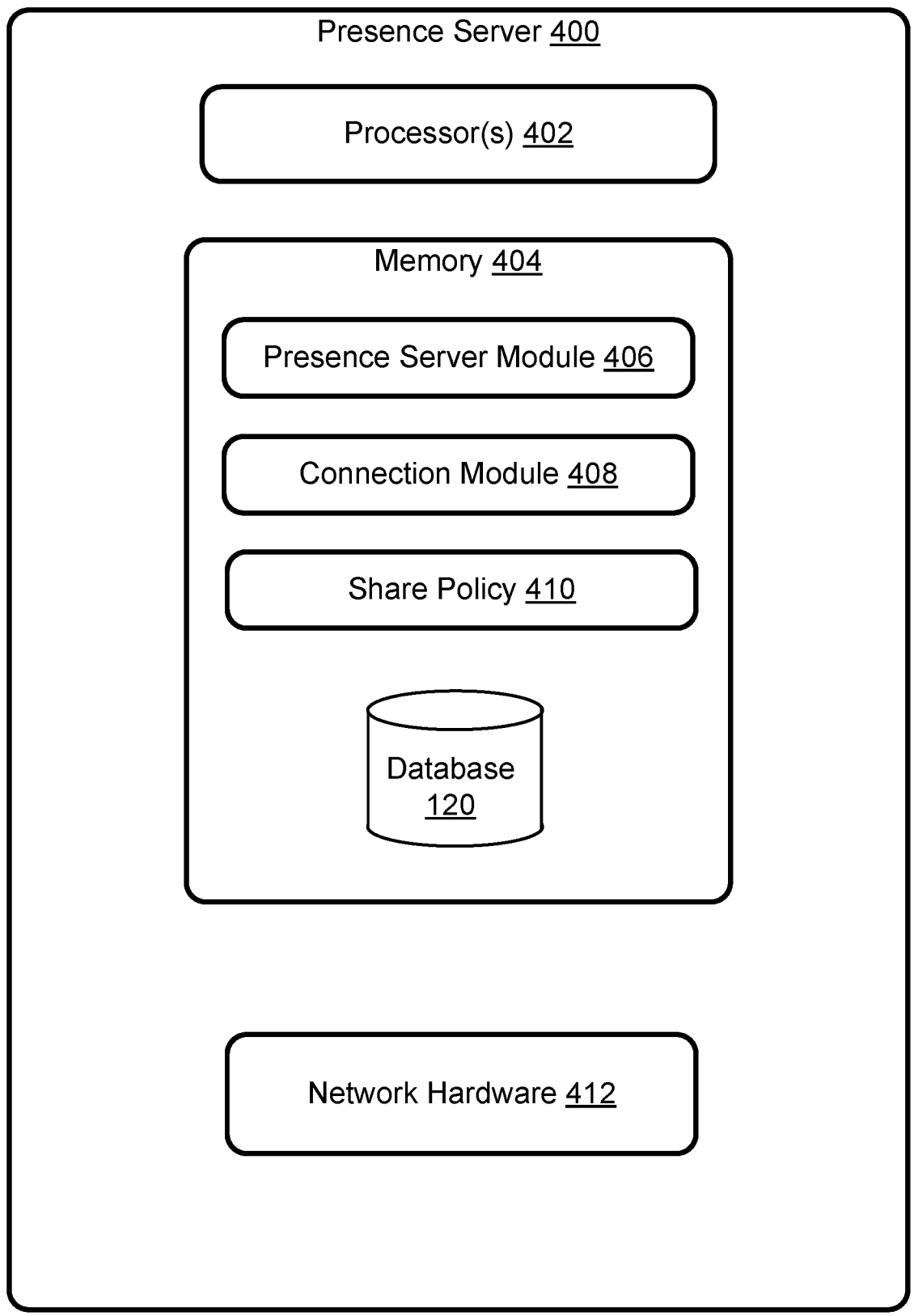
FIG. 4 illustrates an example presence server configured to provide presence information for related devices.

FIG. 4 illustrates an example presence server configured to provide presence information for related devices. As illustrated in FIG. 4, the presence server 400 includes processor(s) 402 and memory 404. The memory 404 includes presence server module 406, which provides presence server services to UE, such as mobile devices including the related devices 102A-D and the mobile device 300. The presence server module 406 is configured to register online presence information of mobile devices, and to provide presence information and/or capabilities information regarding other mobile devices. The presence server module 406 may look up information regarding groups of related devices in the database 120, and provide presence information regarding those related devices to other ones of the related devices. The presence server module 406 may be configured to receive requests from mobile devices for presence and/or capabilities information for contacts generally, including for related devices. The presence server module 406 may be configured to receive requests from the mobile devices for a list of related devices. The presence server module 406 may be configured to provide information indicating which if any devices are related devices associated with the requesting mobile device. The presence serve module 406 may be configured to provide presence and/or capabilities information using OMA Presence SIMPLE protocol, or in some other fashion.

A connection module 408 is configured, in some embodiments, to facilitate establishment of connections between mobile devices, including establishment of connections between related devices. The connection module 408 may be configured to utilize a share policy 410. The share policy 410 may indicate that certain content, such as broadcast content, multicast content, certain streamed content from a content provider (e.g., copyrighted content), content protected by DRM, and so forth may be shared with related devices, and that such content is not to be shared with other devices that do not share a line with the device that received the content from the external source. The connection module 408 may therefore allow certain content received by a mobile device to be shared with related devices, but deny requests to establish a connection and/or share the content with other devices.

Network hardware 412 provides wired or wireless networking capabilities to the presence server 400. The network hardware 412 may include or be incorporated into processors, application-specific integrated circuits (ASICs), programmable circuits such as field programmable gate arrays (FPGAs), or in other ways. The software modules stored on the memory 404 are configured to access hardware via interrupts, calling APIs, and the like. The software modules may also be configured to pass information to one another, such as through APIs, storing commands, parameters, etc. in a predetermined memory location, etc. Other examples are possible without departing from the scope of embodiments.

Figure 5:
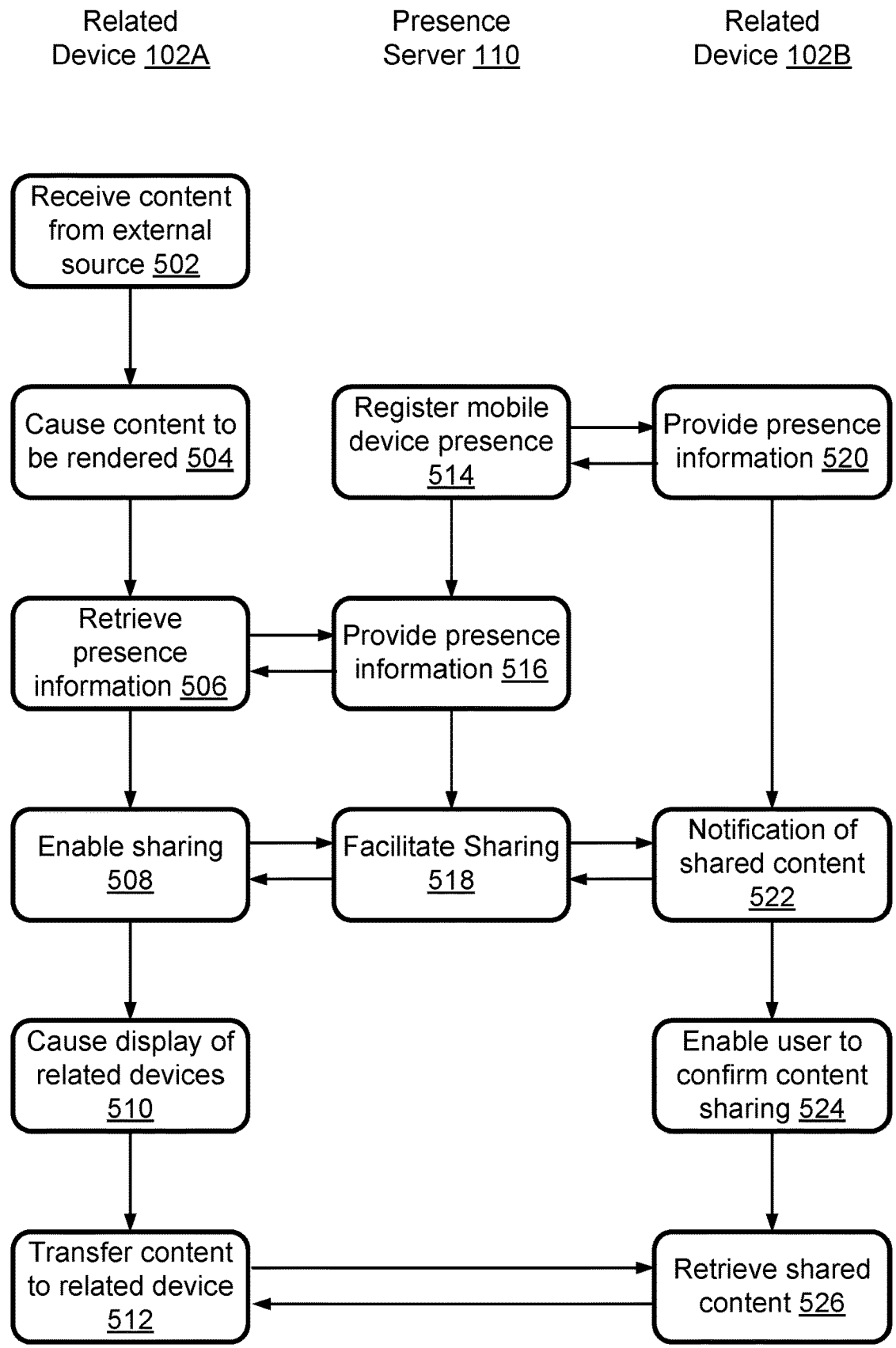
FIG. 5 illustrates an example process for sharing content received from an external source with related devices.

FIG. 5 illustrates an example process 500 for sharing content received from an external source with related devices. At 502, a first related device—such as the related device 102A receives content from an external content source via a wireless connection. As noted elsewhere within this Detailed Description, the content may be received by the first related device via a broadcast or multicast—including via an eMBMS broadcast or multicast—connection. In some embodiments, the content may be received by the first related device via a unicast connection. The content may include in some embodiments, video, audio, text, images, game content, and so forth.

At 504 the first related device causes the content received from the external source to be rendered on the first related device. The first related device may cause the content to be displayed on a display device, output on speakers, output as tactile output, or other.

At 506, the first related device retrieves presence information for one or more related devices, including for example a second related device (e.g., the related device 102B as illustrated in FIG. 5). The one or more related devices may be associated with a same subscriber account and/or configured to utilize the same telephone number as the first related device for sending and receiving at least cellular communications via the cellular network. The first related device retrieves, in some embodiments, the presence information from a presence server, such as for example the presence server 110. The first related device utilizes, in some embodiments, OMA Presence Simple protocol to retrieve the presence information, although in some embodiments other protocols may be utilized.

At 508, the first related device enables the content received from the external source with at least the second related device. In some embodiments, enabling the sharing of the content is accomplished by at least in part signaling to the presence server to establish or facilitate establishment of a connection between the first related device and the second-related device. The first related device may utilize the presence information, such as an IP address or other information, to establish the connection. The first related device may enforce a share policy that indicates that certain content may be shared with related devices, but not with other devices. The share policy may also indicate that certain related devices, such as those that share a line and/or those that share an account may receive the shared content.

At 510, the first related device may cause display of a list of related devices, such as all related devices or a subset of the related devices that have registered their online presence with the presence server. The user may select one or more of the related devices to enable sharing of the content received from the external source. An example UI is illustrated in FIG. 2A.

At 512, the first related device transmits the shared content to the second related device via the connection. The first related device may transmit the shared content to the second related device based at least on the user selection. The first related device may transmit the content automatically (e.g., via a background process without user interaction or involvement), or based on some other criteria such as based on the share policy or different policy. For example, the share policy may indicate that content is automatically shared with related device 102B but not with related devices 102C or 102D.

At 514, the presence server registers the presence and/or capabilities of one or more mobile devices, including for example related devices. The presence server registers the online presence and/or capabilities in some embodiments via OMA Presence SIMPLE protocol, or in some other way.

At 516, the presence server provides the first related device with presence information regarding the second related device. The presence server may provide the information that the second related device provided to the presence server during registration. In some embodiments, the presence server may perform a look-up to a database for a list of related devices, including the second related device and provide that list to the first related device.

At 518, the presence server may facilitate the establishment of a connection between the first related device and the second related device for sharing the content received by the first related device from the external source. The presence server may enforce a share policy to ensure that the content received from the external source is shared with the related devices, and not with other devices.

At 520, the second related device registers with the presence server. The second related devices may utilize OMA presence SIMPLE or other protocol to register its presence and/or capabilities.

At 522, the second related device receives an indication that the first related device has content to share. The second related device may receive this notification directly from the first related device, from the presence server, or in some other way.

At 524, the second related device provides the user with a user interface element that is interactive to enable the user to accept or decline receiving the shared content. An example UI is illustrated in FIG. 2B. In the same or different embodiments, the second related device may enforce a share policy, such that it allows the user to accept certain shared content from related devices, and not from other devices.

At 526, the second related device receives the shared content. The second related device causes the content to be rendered, such as displayed, output on speakers, output as tactile output, or in some other way.

The processes described above in association with FIG. 5 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. In other embodiments, hardware components perform one or more of the operations. Such hardware components may include or be incorporated into processors, application-specific integrated circuits (ASICs), programmable circuits such as field programmable gate arrays (FPGAs), or in other ways. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, comprising:
   receiving information of one or more related devices of a plurality of devices, the plurality of devices being registered with a cellular network to utilize a plurality of unique telephone number, respectively; and
   sending first information of at least one first device of the one or more related devices to a second device of the plurality of devices, based at least in part on the information of the one or more related devices, the first information of the at least one first device being utilized by the second device for sending content to the at least one first device, the at least one first device and the second device each being registered with the cellular network to utilize a shared telephone number.

2. The method of claim 1, wherein the information of the one or more related devices comprises presence information, and the presence information comprises information regarding one or more unique telephone numbers that are associated with the one or more related devices.

3. The method of claim 1, wherein the content is received by the second device via a localized wireless multicast or a broadcast via the cellular network.

4. The method of claim 1, wherein the content is received by the second device via an enhanced Multimedia Broadcast Multicast Services (eMBMS) interface.

5. The method of claim 1, wherein sending the first information of the at least one first device further comprises sending the first information of the at least one first device to the second device via Session Initiation Protocol (SIP).

6. The method of claim 1, wherein the information of the one or more related devices further comprises presence information utilized to establish a connection between the at least one first device and the second device, the content being shared by the second device with the at least one first device via the connection.

7. The method of claim 1, wherein information of the one or more related devices comprises information regarding one or more unique telephone numbers that are associated with the one or more related devices, the first information that is sent based at least in part on the information regarding the one or more unique telephone numbers being utilized by the second device for sending the content to the at least one first device, the content being sent by the second device further based at least in part on second information for the at least one first device being sent from the at least one first device to the second device, the second information indicating an ability of the at least one first device to receive the content.

8. The method of claim 1, wherein the information of the one or more related devices comprises presence information, the first information that is sent based at least in part on the presence information being utilized by the second device for sending the content to the at least one first device, the content being sent by the second device further based at least in part on capabilities information for the at least one first device, the capabilities information being sent from the at least one first device to the second device, the capabilities information indicating an ability of the at least one first device to receive the content, the content comprising at least one of an instant message or shared content.

9. A system, comprising:
at least one processor; and
memory storing instructions that, when executed by the at least one processor, cause the at least one processor to perform operations comprising:
receiving information of one or more related devices of a plurality of devices, the plurality of devices being registered with a cellular network to utilize a plurality of unique telephone number, respectively; and
sending first information of at least one first device of the one or more related devices to a second device of the plurality of devices, based at least in part on the information of the one or more related devices, the first information of the at least one first device being used by the second device for sending content to the at least one first device, the at least one first device and the second device each being registered with the cellular network to utilize a shared telephone number.

10. The system of claim 9, wherein the information of the one or more related devices comprises information regarding one or more unique telephone numbers that are associated with the one or more related devices.

11. The system of claim 9, wherein sending the first information of the at least one first device further comprises sending the first information of the at least one first device to the second device via Session Initiation Protocol (SIP), the first information of the at least one first device being further utilized by the second device to cause a list of the at least one first device to be displayed on a user interface of the second device.

12. The system of claim 9, wherein the content is received by the second device via a localized wireless multicast or a broadcast via the cellular network.

13. The system of claim 12, wherein the localized wireless multicast or the broadcast is unavailable to the at least one first device.

14. The system of claim 9, wherein the content is received by the second device via an enhanced Multimedia Broadcast Multicast Services (eMBMS) interface.

15. The system of claim 9, wherein the information of the one or more related devices comprises an Internet Protocol (IP) address of each of the one or more related devices.

16. The system of claim 9, wherein the information of the one or more related devices comprises presence information, the first information that is sent based at least in part on the presence information being utilized by the second device for sending the content to the at least one first device, the content being sent by the second device further based at least in part on capabilities information for the at least one first device.

17. A server, comprising:
at least one processor; and
memory storing instructions that, when executed by the at least one processor, cause the at least one processor to perform operations comprising:
receiving information of one or more related devices of a plurality of devices, the plurality of devices being registered with a cellular network to utilize a plurality of unique telephone number, respectively; and
sending first information of at least one first device of the one or more related devices to a second device of the plurality of devices, based at least in part on the information of the one or more related devices, the first information of the at least one first device being used by the second device for sending content to the at least one first device, the at least one first device and the second device each being registered with the cellular network to utilize a shared telephone number.

18. The server of claim 17, wherein the content is received by the second device via a localized wireless multicast or a broadcast via the cellular network, wherein the localized wireless multicast or the broadcast is unavailable to the at least one first device.

19. The server of claim 17, wherein the information of the one or more related devices further comprises presence information utilized to establish a connection between the at least one first device and the second device, the connection being used by the second device to share the content with the at least one first device.

20. The server of claim 17, wherein sending the first information of the at least one first device further comprises sending the first information of the at least one first device to the second device via Session Initiation Protocol (SIP).

* * * * *